United States Patent [19]

Schatz

[11] Patent Number: 4,884,405
[45] Date of Patent: Dec. 5, 1989

[54] VALVE ARRANGEMENT FOR A PISTON CHARGER DRIVEN BY EXHAUST GAS PULSES

[76] Inventor: Oskar Schatz, Waldpromenade 16, D-8035 Gauting, Fed. Rep. of Germany

[21] Appl. No.: 171,008
[22] PCT Filed: Jul. 22, 1987
[86] PCT No.: PCT/DE87/00330
§ 371 Date: Mar. 22, 1988
§ 102(e) Date: Mar. 22, 1988
[87] PCT Pub. No.: WO88/00645
PCT Pub. Date: Jan. 28, 1988

[30] Foreign Application Priority Data

Jul. 24, 1986 [DE] Fed. Rep. of Germany ....... 3625050

[51] Int. Cl.[4] .............................................. F02B 37/00
[52] U.S. Cl. .................................. 60/605.1; 417/380; 417/392
[58] Field of Search ................. 60/605.1; 91/218, 325; 417/380, 392, 395

[56] References Cited

U.S. PATENT DOCUMENTS

| 3,421,448 | 1/1969 | Brewer et al. | 417/395 |
| 4,166,410 | 9/1979 | Schlosser . | |
| 4,403,925 | 9/1983 | Kuhlen et al. | 417/395 |

FOREIGN PATENT DOCUMENTS

| 126466 | 11/1984 | European Pat. Off. . | |
| 2139932 | 2/1973 | Fed. Rep. of Germany | 417/380 |
| 781790 | 3/1935 | France . | |
| 815494 | 6/1959 | United Kingdom | 60/605.1 |
| 2003545 | 3/1979 | United Kingdom . | |

Primary Examiner—Michael Koczo
Attorney, Agent, or Firm—Harness, Dickey, Pierce

[57] ABSTRACT

A piston charger being driven by exhaust gas having a mechanism controlling the exiting of the exhaust gas from the charger. The control mechanism is coupled with the charger piston and includes a member for opening and closing the exhaust gas outlet. Also included is a method of driving the piston charger.

3 Claims, 14 Drawing Sheets

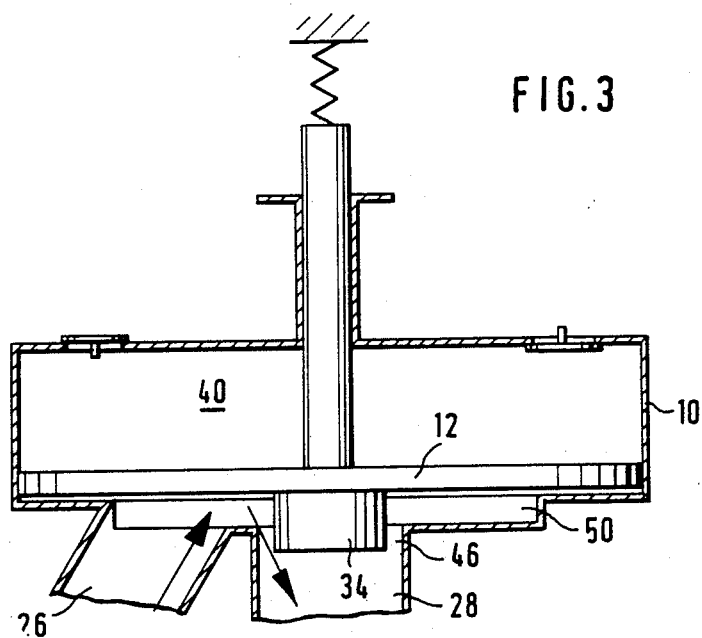
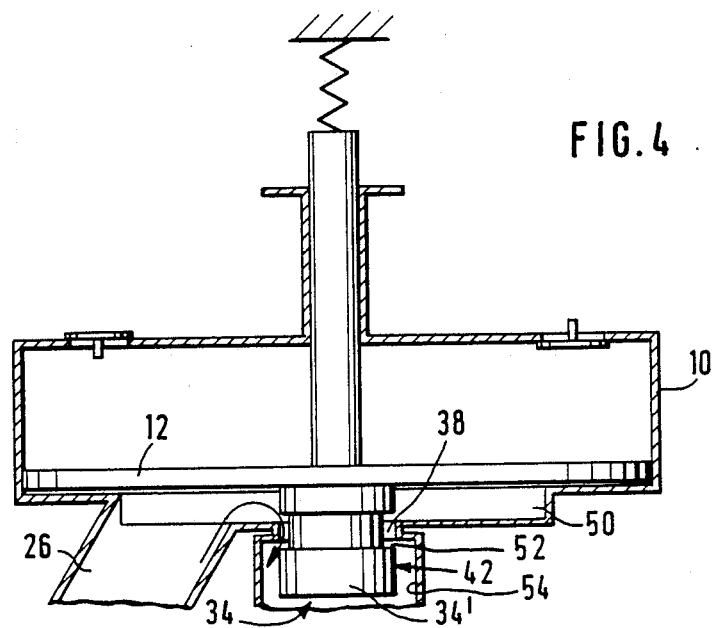

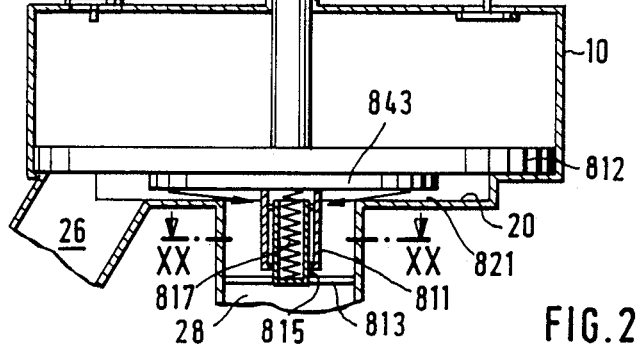
FIG. 19
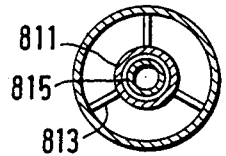
FIG. 20
FIG. 21
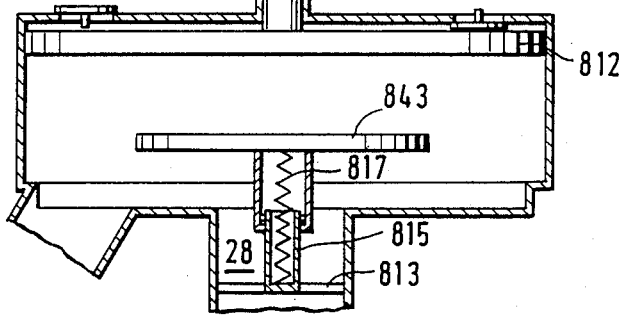

VALVE ARRANGEMENT FOR A PISTON CHARGER DRIVEN BY EXHAUST GAS PULSES

The invention relates to a method for the operation of a valve adapted to be operated in step with the exhaust gas outlet of a piston charger adapted to be driven by the exhaust gas pulses of an IC engine, which has at least one expansion space, which has at least one exhaust gas inlet and an exhaust gas outlet and is delimited by a moving piston, and to a piston machine for implementing such a method.

In order to make it possible for the usable energy of the exhaust gases arriving at the piston charger to be optimally used, control of the exhaust gas outlet is required, because otherwise a large proportion of the exhaust gases is able to escape from the expansion space without performing work. A valve in the exhaust gas outlet in the case of an exhaust gas driven piston charger is mentioned in the German unexamined specification 3,318,136 without however providing any information as to how such control or operation is to take place.

Known piston machines for operation by the exhaust gases of an IC engine have a valve operating system on the outlet side, which is driven directly from the IC engine. This leads to complex and accordingly expensive designs, which furthermore hinder freedom of the arrangement in space of the piston machine in relation to the IC engine. If the piston machine is operated as an auxiliary machine in cooperation with the IC engine, and more especially as a charger, an adaptation of the piston machine to the operational state of the IC engine is required, which in the case of valve operation directly from the IC engine is not automatically possible, unless there is an additional and expensive operating system.

It is desirable for the charger to operate even in partial load states, if the usable energy of the exhaust gas pulses is possible not sufficient to cause a full piston stroke in the piston machine. Then it is particularly important for the exhaust gas outlet of the piston machine to be closed as soon as possible in order to prevent any loss of usable energy. On the other hand, the exhaust gas outlet should remain open as long as possible after the working stroke and after the return stroke of the working piston in order to allow the exhaust gas pulses, which are expelled from the IC engine after the working stroke, to flow out with as little obstruction as possible, i.e. without causing back pressure.

One object of the invention is to provide a method of the initially mentioned type such that there is a minimum amount of complexity for the operation of the piston charger, such operation being via a valve from the exhaust gas outlet for the optimum utilization of the exhaust gas pulses of the IC engine, the method furthermore being designed to offer the possibility of automatically adapting the piston charger to the current operational state of the IC engine. A further object of the invention is to devise a valve arrangement such that it is suitable for implementation of the method.

In the context of the initially mentioned method, this object of the invention is to be attained inasfar as the kinetic energy for valve operation is extracted from the usable energy of the rhythmically arriving exhaust gas pulses.

Apart from the exhaust gas duct conducting the exhaust gases from the IC engine to the piston machine in this method no further connection between the IC engine and the piston machine for valve operation is required.

In order to implement the method it is possible to use a valve arrangement and a piston machine able to be driven by the exhaust gas pulses of an IC engine and having at least one expansion space delimited by a moving working piston, the limit of the expansion space opposite to the working piston being provided with at least one exhaust gas inlet and at least one exhaust gas outlet, the latter being provided with an actuated closing member.

In order to be able to apply the method in accordance with the invention to such a valve arrangement, the valve arrangement is so designed, in accordance with a very simple, practically tested form of the invention, that the closing member is in the form of a protrusion fixedly connected with the working piston, such protrusion extending into the exhaust gas outlet during at least part of the piston motion and at least partly occupying the cross section of the latter.

On the arrival of an exhaust gas pulse with sufficient usable energy, the working piston is moved clear of the limit, having the exhaust gas outlet, of the expansion space so that the protrusion provided on the working piston frees the full cross section of the exhaust gas outlet, when the piston motion exceeds the maximum depth of penetration into the exhaust gas outlet. The exhaust gas may then discharge without any obstruction until the protrusion moves back into the exhaust gas outlet during the return stroke of the working piston. The timing and the usable energy are dependent on the operational energy of the IC engine which is the source of the exhaust gas. The valve arrangement as described makes possible an operation of the valve at the exhaust gas outlet by the exhaust gas pulses of the IC engine and in a way dependent on the respective operational state of the IC engine, the amount of design complexity being very small and being limited to the arrangement of a protrusion on the working piston and an adaptation of the cross sections of this protrusion of the exhaust gas outlet. Apart from the exhaust gas duct no further connection is needed to the IC engine so that there is a large degree of freedom as regards the arrangement in space. Since there is no need for additional moving parts, the designer may be sure of a high degree of reliability of the valve operating means.

In accordance with an advantageous form of the invention in the case of a protrusion completely introduced into the valve section of the exhaust gas outlet intended for receiving the protrusion it is possible for the distance between the periphery of the protrusion and the limit of the valve section to vary in the direction of motion of the working piston. As result it is possible for the exhaust gas flow cross section to be continuously or discontinuously varied in a way dependent on the motion of the working piston in order to ensure optimum adaptation to suit the respective conditions of operation. It is thus possible to provide a large gap cross section between the protrusion and the limit of the valve section, for instance at the lower reversal position of the working piston, such protrusion serving to make possible unimpeded discharge of the exhaust gas during engine idling (when no charger operation is needed or when the working piston is halted), while energy of the exhaust gas, which increases on there being an increase in load of the IC engine, will move the working piston out of the lower reversal position and thus, owing to the differences in cross section, will decrease the cross section of the gap in order to use the energy of the exhaust gas optimally for the operation of the piston charger until shortly prior to reaching the upper reversal position the protrusion clears the valve section and thus frees its full cross section for the escape of the expanded exhaust gas.

Another advantageous embodiment of a valve arrangement for implementing the method in accordance with the invention is one in which a moving closing member of the valve is adapted to be moved by the working piston. On the arrival of an exhaust gas pulse with sufficient usable energy the working piston is moved out of its resting position, in which it is located near to the limit of the expansion space provided with the exhaust gas inlet and the exhaust gas outlet. In accordance with a law of motion to be adapted to the purpose of the device, the motion of the working piston is used for operation of the valve: more particularly, it is possible for the valve to be closed at once in order to be able to utilize kinetic energy in the optimum manner for moving the working piston.

In this respect it is possible to have a connection which is permanent during operation, or to have a releasable coupling connection, between the closing member and the working piston, such a coupling connection being automatically releasable in accordance with a preferred form of the invention. As a result it is possible for the transmission of the piston movement for operation of the valve to be temporarily discontinued so that the change in pressure with time in the cylinder of the piston charger is affected. In particular, it possible for the length of time required for the opening and/or the closing of the valve at the exhaust gas outlet to be reduced to a fraction of the working or return stroke, respectively, of the working piston so that it is then possible to achieve a more efficient utilization of the working energy of the exhaust gas pulses. Moreover, the modification of the change in pressure may also lead to an effect on the time/motion function of the motion.

An especially convenient feature of the invention is one in which a setting member for moving the closing member is connected with the working piston via a coupling which is unclutched on reaching a setting force threshold and in which the closing member may be moved between its opening and its closed positions as defined by abutments, although however in accordance with another convenient form of the invention a setting member for moving the closing member is held by a stationary coupling (which is released on reaching a setting force threshold) and an entraining device, which has play in the direction of motion, and is coupled with the working piston for displacement in relation to the stationary coupling, the coupling which is able to be released on the setting force threshold being exceeded being a friction coupling.

In accordance with another, extremely advantageous development of the invention the closing member is arranged so that it is freely guided in the working piston in the direction of its stroke between two limit settings and in the lower limit setting it protrudes to a maximum extent from the piston for shutting off the exhaust gas outlet. In the case of this form of the invention it is possible for the closing member to change or to keep its position in relation to the working piston owing to its inertia, so that there is a simple, non-complex design while nevertheless ensuring advantageous timing of opening and closing. When the piston commences its working stroke the closing member will remain in its setting blocking the exhaust gas outlet until it has reached its lower limit setting in relation to the working piston, something that best takes place shortly before the working piston ends its working stroke. The outcome of this is that the closing member is accelerated towards its upper limit setting, while the working piston performs its return stroke shortly after this. In this respect the closing member initially still moves towards its upper limit setting. As soon as it has reached such position, it is entrained by the working piston in the opposite direction, the closing member remaining plunged into the working piston until the working piston has completed its return stroke so that during the full return stroke of the piston the exhaust gas outlet remains open. When the working piston has ended its return stroke, the closing member will continue to go on moving owing to inertia until it closes the exhaust gas outlet to the required degree.

In accordance with another convenient embodiment of the invention there is an entraining connection between the closing member and the working piston, such connection being adapted to be only effective towards the closed position of the closing member, the closing member being able to be locked in its closed setting by an automatic locking means and being biased towards its open position and the locking means is able to be released by the working piston in the final phase of the working stroke caused by the exhaust gas pulse.

This design means that the closing member is retained in its closed setting during the working stroke of the working piston until the working piston itself releases the locking means, whereupon the valve is moved rapidly under the influence of the biasing effect into its fully opened setting. The entraining connection between the working piston and the closing member is preferably so designed that it is only at the end of the return stroke that the valve is moved back into its closed setting.

Another convenient development of the invention is one in which there is frictional engagement between the setting member and the working piston and such that between the setting member and the working piston there is a reversing mechanism for contrary connection between the setting member and the working piston. As a result at the commencement of its stroke the working piston will close the exhaust gas outlet and at the beginning of the return stroke it will close the exhaust gas outlet.

In accordance with a further expedient form of the invention the closing member covers over the exhaust gas outlet and is biased by a spring arrangement towards the floor, facing the exhaust gas outlet, of the working piston. In the case of this form of the invention the exhaust gas pulse moving the working piston for causing the working stroke will firstly press the closing member onto the exhaust gas outlet and close the latter as a result, the spring force increasing during the working stroke until it finally overcomes the exhaust gas pressure and clears the closing member from the exhaust gas outlet. In this case it is possible for the spring arrangement to have two entraining members, spaced apart in the stroke direction of the working piston, on the working piston and on the closing member, there being a spring element arranged between them in order to move the piston and the closing member into its adjacent position. In accordance with a further modification of the invention it is possible for the spring arrangement to slightly lift the closing member from the exhaust gas outlet when the working piston is in its end position adjacent to the exhaust gas outlet, this being with the formation of an outlet gap, so that the exhaust gas pulses may be let off without operation of the working piston located in the resting position, via the exhaust gas outlet, when such gases only have a small amount of usable energy, more particularly during idling of the IC engine.

If there is a non-releasable connection between the closing member and the working piston during operation of the system, it will be an advantage if the working piston is provided with a means delaying the return stroke thereof. This ensures that the exhaust gas outlet remains open for a relatively long time into order to make it possible for the expanded exhaust gas to flow as completely as possible out of the cylinder of the piston machine and thus to reduce the force to a minimum which opposes the return stroke of the piston after the closing then occurring of the exhaust gas outlet by the compression of the exhaust gas remaining in the cylinder.

The delay of the return stroke may be caused by a device, which temporarily holds the piston in the reversal position remote from the exhaust gas outlet or by a device which is adapted to delay the return stroke of the working piston so as to take place at a lower speed than the speed of the working piston. In accordance with a convenient embodiment of such a device there is a damping piston running in a cylinder and coupled with the working piston and which in the cylinder delimits a variable-volume damping chamber, which is provided with a check valve which opens during the working stoke and has a large opening cross section and is provided with a choke orifice. During the return stroke of the working piston the check valve closes and the flow as caused by the change in volume of the damping chamber is via the choke orifice, this ensuring that the return stroke is retarded.

In keeping with a further expedient form of the invention it is possible to arrange a compression chamber on the side, remote from the damping chamber, of the damping piston in the cylinder, the volume of this compression chamber becoming smaller during the working stroke of the working piston. The pressure which builds up during the working stroke in the compression chamber stores the return force for the working piston. In accordance with a particularly suitable form of the invention it is possible for the compression chamber to be connected via an adjustable pressure controller with a pressure accumulator so that there is a possibility of setting the return force acting on the damping piston and thus on the working piston, that is to say for adjustment in accordance with the operational condition of the IC engine supplying the exhaust gas.

If the working piston is to be retained in the upper dead center position remote from the exhaust gas outlet, in accordance with one possible form of the invention, the working piston is provided with a releasable latch in the reversal position remote from the exhaust gas outlet. In this respect a particularly advantageous form of the invention is possible in which the piston charger includes two working pistons which are fixed to each other for ganged motion and of which each defines an expansion space and which are arranged to be acted upon by the exhaust gas pulses alternately and in opposite directions and the latch associated with the one respective working piston is able to be released by the exhaust gas pulses acting on the other respective working piston.

A further preferred embodiment of the invention is so designed that the latch consists of a spring arrangement which has two stable terminal positions to the two sides an instable center position and is so connected with the working piston that it assumes one of its two terminal positions together with the working piston.

In this form of the invention, which is more particularly suitable for two working pistons alternately driven by the gas and ganged for a joint motion, the spring arrangement being associated with both working pistons in common, after one half of the working stroke the instable center position is exceeded and the force of the spring acting towards the stable terminal positions supports the piston motion in the respectively selected position. If in partial load conditions of the IC engine the usable energy of the exhaust gas pulses is not sufficient to cause a complete working stroke of the working piston, it is sufficient if the exhaust gas pulse moves the working piston for half the stroke, because then the spring arrangement will move the piston right into its terminal position and will keep open the exhaust gas outlet associated with it until the arrival of the next exhaust gas pulse directed towards the other piston and having the opposite direction. At the same time the spring arrangement will aid in the complete expulsion of the expanded exhaust gas. Furthermore, it will keep the working piston in its terminal position. If the exhaust gas pulses only occur with a small amount of usable energy.

In accordance with an other expedient form of the valve arrangement for implementing the method a closing member covering over the exhaust gas outlet is guided in the stroke direction of the working piston between a closing position covering the exhaust gas outlet and an open position clear of the exhaust gas outlet and is urged by a spring towards its open position and the closing member is so pressed in the resting position, adjacent the exhaust gas outlet, by engagement with the working piston against the limit or wall, opposite to the working piston, that a small gap is left between the closing member and such limit or wall.

This small gap makes it possible for the exhaust gas expelled by the IC engine between the exhaust gas pulses during the desired dwell setting of the working piston and the exhaust gas produced during idling to escape. If the pressure of the exhaust gas increases, the rate of flow through the gap will also increase within it, so that following the Bernoulli Law there will be a decrease in pressure. The drop in pressure under the closing member will mean that the latter will be drawn against the limit of the expansion space and will close the exhaust gas outlet so that optimum use may be made of the usable energy of the exhaust gas pulse for moving the working piston. The pressure in the expansion space will hold the closing member closed until there has been such an expansion of the exhaust gas that the spring will overcome the exhaust gas pressure in the expansion space or the closing member will be entrained by the working piston. Towards the end of the return stroke the working piston will move the closing member back into the starting position, in which the gap between the closing member and the limit of the expansion space is opened.

A further possible development of the valve arrangement is possible in accordance with which the closing member is provided with an actuating mechanism, which as a driving element comprises a displacement element arranged to be acted upon by the exhaust gas pulses, the arrangement being so selected that the closing member may be transferred into its closed setting when the displacement element is acted upon by the pressure. In this respect the actuating mechanism may be provided with a resisting means, as for instance one in the form of a returning means, acting in the opposite direction to the exhaust gas pulse. This makes it possible for the response threshold to be such that the valve remains open during idling operation of the IC engine.

In accordance with a further and more especially advantageous form of the invention the driving element is connected at a point upstream from the exhaust gas inlet of the expansion space with an exhaust gas duct leading to the expansion space. As a result the exhaust gas pulse is caused to give up the amount of usable energy needed for operation of the valve before the exhaust gas pulse has reached the expansion space and possibly actuated the working piston so that the valve is closed at the start of the piston motion and thus the amount of exhaust gas loss may be kept small.

The displacing element is preferably in the form of a piston or diaphragm.

If the motion of the closing member is caused by transmission of the motion of the working piston or of a displacing element, it is possible for the closing member to be in the form of a turning door, which is able to be swung between a closing and an opened position about an axis transversing the exhaust gas outlet, this meaning that the inertia of the mass to be moved may be kept very low.

The invention will now be explained in more detail with reference to the working examples of the valve arrangements of the invention as used in piston machines serving as a charger.

FIG. 3 is an axial section similar to that of FIG. 1 taken through a somewhat modified form of the invention.

FIG. 4 shows an axial section, similar to that of FIG. 3, taken through a further form of the invention.

FIG. 19 is an axial section taken through another form of the valve arrangement in the resting state of the working piston.

FIG. 20 is a section taken on the line XX—XX of FIG. 19.

FIG. 21 shows an axial section similar to that of FIG. 19 after the completion of the working stroke of the working piston.

Figure 1:
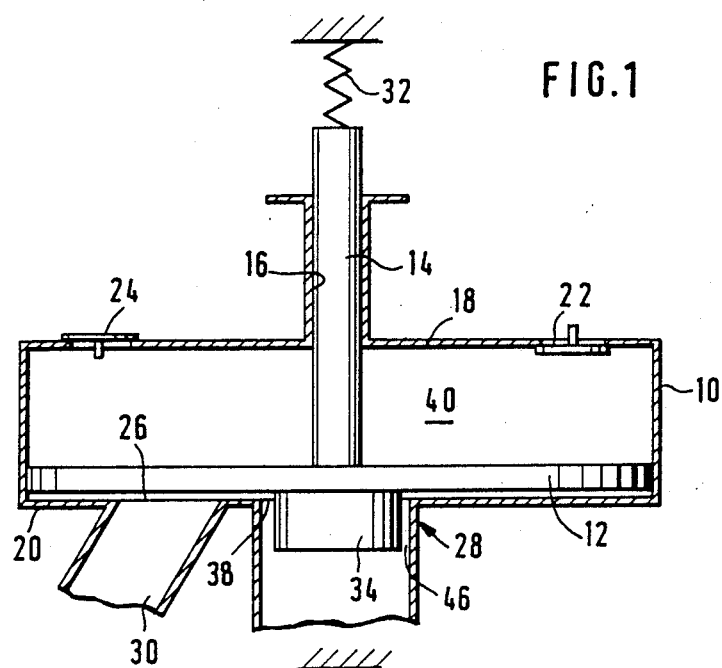
FIG. 1 is a diagrammatic axial section through the cylinder of a piston machine adapted to operated as a charger, the working piston of this piston machine being located at the lower point of reversal.

A cylinder of a piston machine to be used as a charger driven by exhaust gas for an IC engine is referenced 10 and comprises a flat working piston 12, which is connected with a piston rod 14, which extends out of the cylinder 10 and outside the cylinder 10 runs in a guide 16 for linear motion. The cylinder 10 is delimited by an upper end surface 18, which has the piston rod 14 running through it in outward direction and by a lower end surface 20.

The upper end surface is provided with a charging air inlet valve 22 and a charging outlet valve which are designed to act as check valves.

The lower end surface 20 is provided with an exhaust gas inlet 26 and with an exhaust gas outlet 28. The exhaust gas outlet 28 is arranged concentrically in relation to the cylinder while the exhaust gas inlet 26, which may be supplied via a duct 30 with exhaust gas pulses from an IC engine (not shown) is arranged to the side of the exhaust gas outlet.

A return device, which is diagrammatically shown in the form of a compression spring 32 acting on the piston rod 14, urges the working piston 12 into its lower position of reversal adjacent to the exhault gas inlet 26 and the exhaust gas outlet 28.

Figure 2:
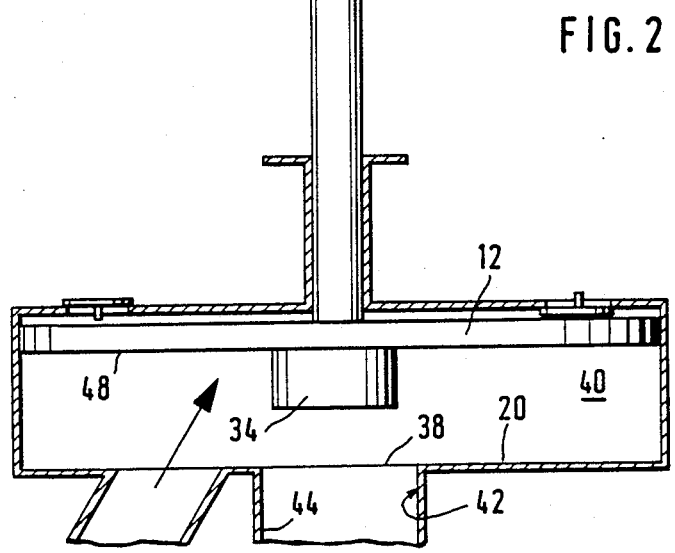
FIG. 2 shows a further axial section similar to that of FIG. 1 in which the working piston is located at the upper point of reversal.
Figure 5A:
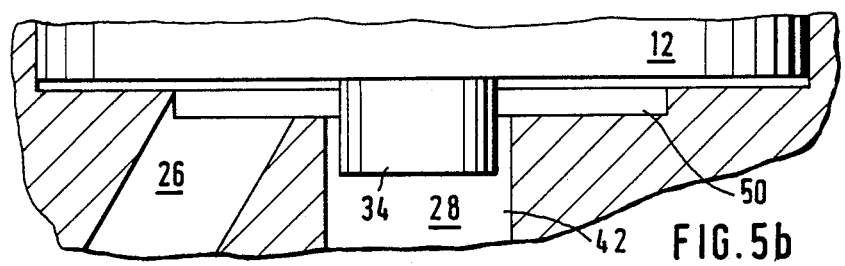
FIGS. 5a to 5k show possible modifications of the form of the cross section in the valve section of the exhaust gas outlet.
Figure 5B:
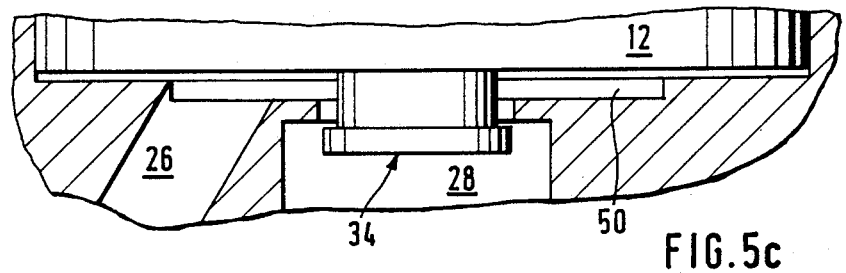
Figure 5C:
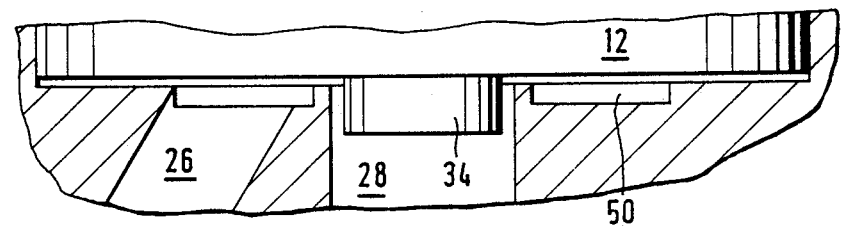
Figure 5D:
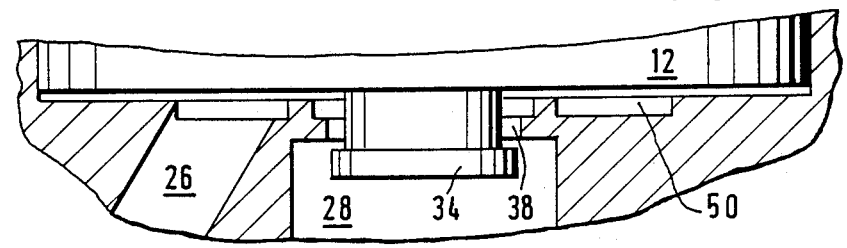
Figure 5E:
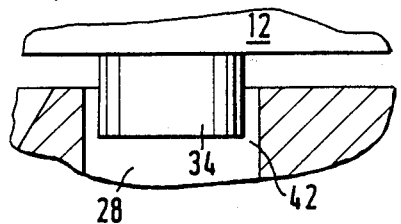
Figure 5G:
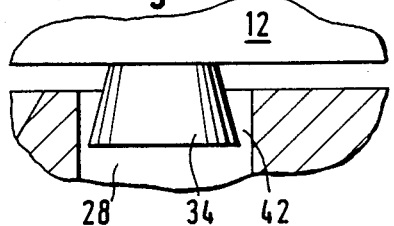
Figure 5I:
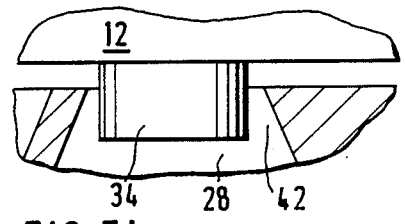
Figure 5K:
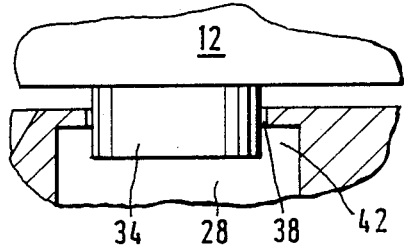
Figure 5F:
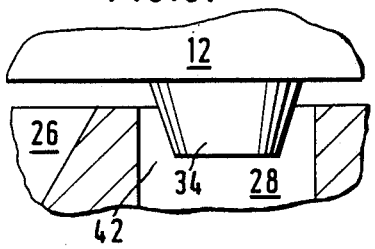
Figure 5H:
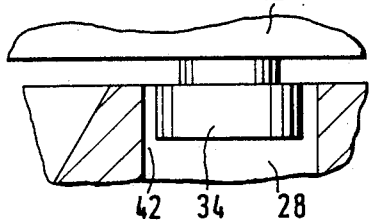
Figure 5J:
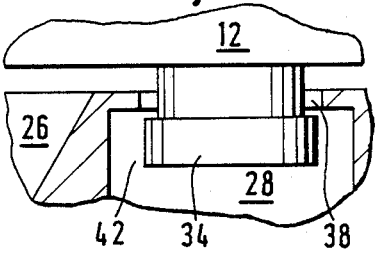

If now an exhaust gas pulse arrives at the exhaust gas inlet 26 in this position of the working piston 12 (FIG. 1) via the duct 30, said pulse having sufficient usable energy, the working piston 12 is moved into its upper point of reversal as shown in FIG. 2 inasfar as the usable energy of the exhaust gas pulse is able to be utilized by expansion of the exhaust gas in the cylinder 10. It is therefore necessary to prevent the exhaust gas flowing out of the exhaust gas outlet 28 without being made use off.

For this purpose the working piston 12 is provided with a protrusion 34 on its side facing the lower end face 20 of the cylinder 10, such protrusion extending into exhaust gas outlet 28 in the lower terminal position of the working piston 12. Adjacent to the outlet 28 there is a valve section 42 adjoining the opening 38 into the cavity 40 of the cylinder, such valve section 42 extending in the direction of the piston stroke and having the protrusion 34 extending into it for a certain length, when the working piston 12 is at the lower point of reversal.

This ensures that the protrusion 34 closes the cross section of the valve section 42 or of the exhaust gas outlet 28 at least until the working piston 12 has performed a substantial part of its working stroke from the lower to the upper point of reversal.

In FIGS. 1 and 2 the valve section 42 is delimited by a cylindrical wall 44 and the protrusion 34 on the working piston 12 is also cylindrical in form, although it has a somewhat smaller diameter than the wall 44 so that when the protrusion 34 is located partly or completely at the valve section 42, there is still an annular gap 46 between the wall 44 and the cylindrical periphery of the protrusion 34. This gap 46 is of such a size that the exhaust gas expelled between consecutive exhaust gas pulses of the IC engine during the desired dwell setting of the working piston 12, or the exhaust gas produced during idling, is able to escape without operation of the working piston 12 through the gap 46 of the exhaust gas outlet 28.

In order to ensure that the piston floor 48 facing the exhaust gas inlet 26 and the exhaust gas outlet 28 does not impede the transfer of exhaust gas from the exhaust gas inlet 26 to the exhaust gas outlet 28 during idling operation or during the dwell setting of the working piston 12, it is possible to make the piston floor 48 or the lower end surface 20 with a suitable shape. FIG. 3 shows a recess 50 for this purpose which is arranged in the lower end surface 20 and is concentric to the cylinder, so the exhaust gas inlet 26 and the exhaust gas outlet 28 open into the recess 50.

The gap 46 is important when the working piston 12 is located at the lower point of stroke reversal. If the usable energy of the incoming exhaust gas pulse is to be utilized in order to move the working piston 12 towards its upper point of reversal, this energy is to be optimally used. There is thus a requirement for the exhaust gas outlet 28 to be closed as completely as possible as soon as the working piston 12 has moved out its lower terminal position. FIG. 4 shows a design of the protrusion 34 and of the valve section 42, which complies with this requirement. The opening 38 of the valve section 42 is in the form of a restricted passage, which is adapted to the diameter of the cylindrical protrusion 34 in order in this manner to essentially prevent flow through the exhaust gas outlet 28, when the protrusion 34 fits into the restricted part of the opening 38. However, the protrusion 34 is provided with an annular groove 52, whose axial extent is greater than the restricted opening 38 and which in the axial direction is aligned so as to be central in relation to the restricted opening when the working piston 12 is in its lower point of reversal so that the groove 52 makes possible flow transfer around the restriction. Downstream from the restricted opening 38 there is a wider cross section 54 of the valve section 42 so that there is an annular gap 46 between this wider section 42 and the cylindrical outer surface of the section 34' of the protrusion 34 extending from the side, remote from the working piston 12, of the groove 52.

If the working piston 12 is moved towards the upper point of reversal, this section 34' will move into the restricted part of the opening 38 and prevents outflow of exhaust gas from the cylinder 10 until the protrusion 34 has completely cleared the valve section 42. This opening of the exhaust gas outlet 28 takes place even prior to reaching the upper point of reversal so that in the case of the return stroke of the working piston 12 as well the exhaust gas outlet will firstly remain open in order to make possible the outflow of the expanded exhaust gas.

FIGS. 5a to 5k will indicate that there is a wide range of possibilities to make use of suitable shapes of the valve section 42 and/or of the protrusion 34—this being to take into account of the motion of the working piston as well—to achieve different flow conditions in accordance with the operational requirements, at the exhaust gas outlet 28. More particularly by changing the gap cross section between the protrusion 34 extending into the valve section and the wall of the valve section 42 it is possible to affect the through flow coefficient.

Figure 6:
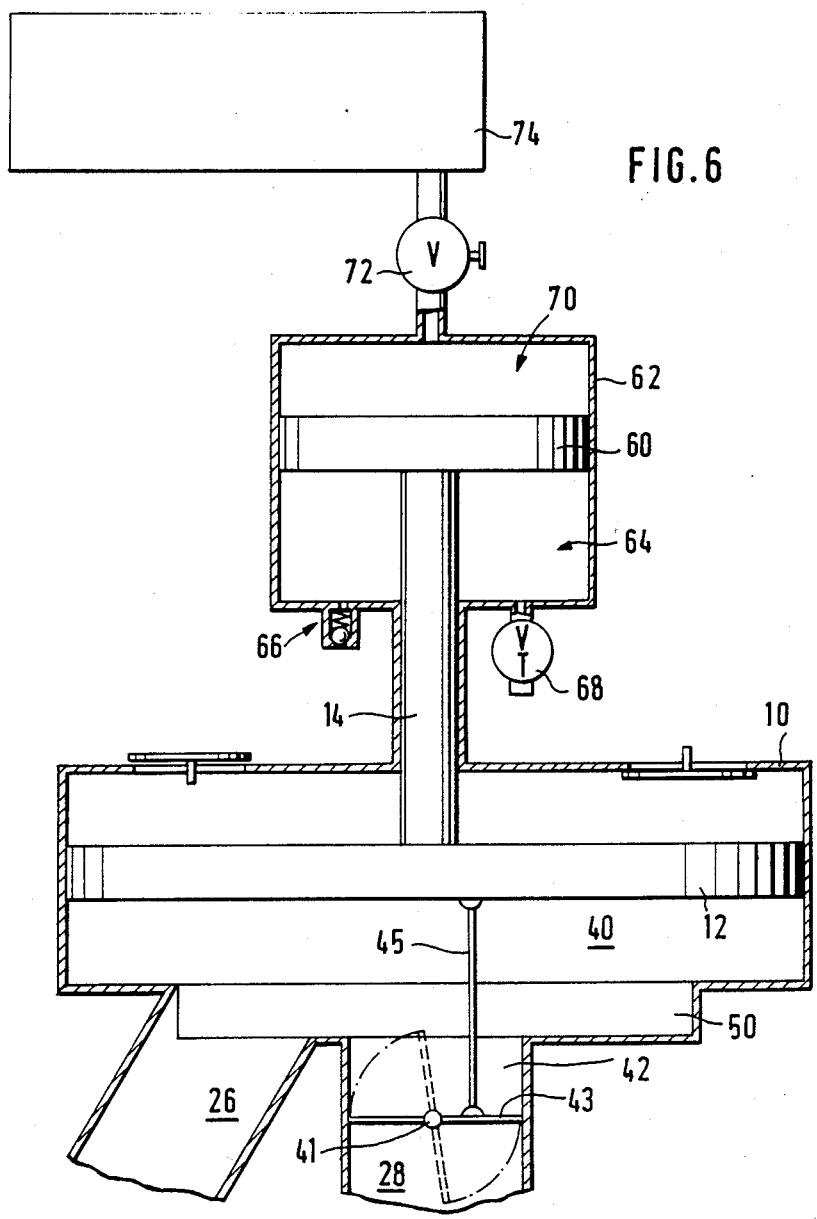
FIG. 6 shows an axial section taken through a further modification of the valve arrangement with a turning door as a closing member and with a device for retarding the return stroke, the working piston having moved through about half its working stroke.
Figure 7:
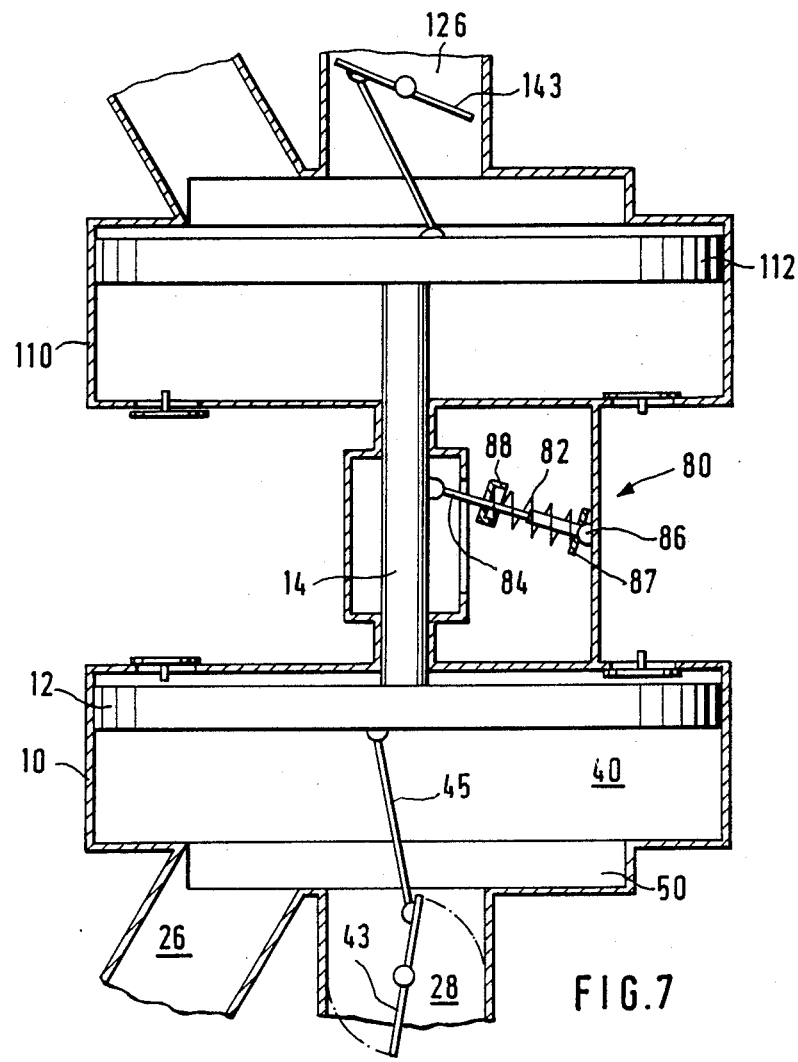
FIG. 7 shows an axial section after the end of the stroke of the working piston with a modification of the device for retarding the return stroke using a second cylinder.

To take an example, in FIGS. 6 and 7 the valve section 42 has a pivot pin 41 extending through it diametrally to carry a circular valve flap 43 in the form of a disk. The valve flap 43 is connected by a setting rod 45 articulated to it with the working piston 12 so that it is pivoted as soon as the working piston moves upwards and downwards in the cylinder 10.

In this respect the valve flap 43 is so arranged that as compared with the arrangement shown in FIG. 6, in which the setting rod 45 engages the valve flap 43 to the right of the pivot pin 41, it slopes slightly upwards in the resting state of the working piston 12 from the right to the left, that is to say the setting rod 45 connected with the valve flap 43 has its lowest setting. In this position the exhaust gas outlet 28 is opened so far that exhaust gas having a low content of usable energy may escape without operation of the working piston 12.

If the usable energy of the exhaust gas pulses should increase, the working piston is moved upwards from the lower reversal point so that the setting rod 45 pivots the valve flap 43 in FIG. 6 counterclockwise and the cross section of the exhaust gas outlet 28 is firstly restricted so that the exhaust gas energy may be substantially used for moving the working piston 12. As the working stroke of the working piston continues the valve flap 43 gradually opens again until it has reached its fully open setting when the working piston 12 is at the upper reversal point so that the expanded gas 28 is able to flow out through the exhaust gas outlet 28 without hindrance. During the return motion of the working piston 12 of the valve flap 43 gradually shuts again, moves through its closed position and will be open again by the time the working piston 12 has reached its lower reversal point.

If, as in the embodiment just described, there is a non-releasable connection between the working piston 12 and the closing member of the valve, in the present case the valve flap 43, it is desirable for the return stroke of the working piston 12 to be delayed in order to keep the exhaust gas outlet 28 open as long as possible for the outflow of the expanded exhaust gas. In this respect it is either possible to slow down the piston during the return stroke or it is possible to retain the working piston after reaching the upper reversal point for a certain time before the return stroke takes place.

FIG. 6 shows a design which reduces the speed of the return stroke of the working piston 12. In this case the piston rod 14 is connected with a damping piston 60 which runs in a cylinder 62 and in this cylinder 62 delimits a damping chamber 64 whose volume will be changed by the motion of damping piston 60. The arrangement is such that the volume of the damping chamber 64 becomes larger when the working piston 12 performs its working stroke. In the wall of the cylinder 62 there is a check valve 66 with a comparatively large flow cross section, which allows unhindered flow of fluid thereinto during the working stroke, but closes during the return piston motion. A choke orifice 68 is placed parallel to this check valve 66. Since during the return stroke of the working piston 12 the fluid in the damping chamber 64 has to leave via the choke orifice, the return stroke is retarded or slowed down in accordance with the choke cross section.

On the side of the damping piston 60 remote from the damping chamber 64 it is possible to provide a compression chamber 70 in the cylinder 62 which serves to produce the return force for the working piston 12. During the working stroke of the working piston 12 a gaseous medium located in the compression chamber 70 is compressed so that a pressure is exerted on the damping piston 60 which tends to urge the working piston 12 back into its lower reversal point.

It is possible for the compression chamber 70 to be connected by a pressure regulating device 72 with a pressure accumulator 74 so that the pressure in the compression chamber 70 may be set to suit the respective operating conditions.

Another design for causing retardation of the return stroke is shown in FIG. 7 in which there is a second cylinder 110, coaxial to the cylinder 10 of the piston machine serving as a charger. In each cylinder 10 and 110 there is respective working piston 12 and, respectively, 112, which is connected with a valve flap 43, and respectively, 143. The two working pistons 12 and 112 are fixedly joined with each other by a common piston rod 14. The manner of operation of the two cylinders 10 and 110 is the same as in the above-described example of the invention and is therefore not explained again. It is however to be noted that the exhaust gas inlets 26 and, respectively, 126 are so connected with the IC engine that the pulses coming from it alternately act on the two working pistons 12 and 112.

A spring arrangement generally referenced 80 has a compression spring 82, which is mounted on a spring guide 84 consisting of two elements able to telescope in relation to each other and which is movingly mounted in a plane containing the axis of the cylinders 10 and 110 for pivoting motion about an axis 86 cutting this plane at a right angle and is so connected with the one element carrying a first counter-bearing 87 and connected with the other element carrying a counter-bearing with the piston rod 14 that the spring guide 84 moves through a sector, when the piston moves, whose bisecting line cuts the axis of the two cylinders 10 and 110 at a right angle so that the spring guide 84 runs at a right angle to the cylinder axis, when the pistons 12 and 112 have moved along half of their strokes. The compression spring 82 placed between the counter-bearings 87 and 88 is thus compressed to its smallest length when half a piston stroke place and thus assumes a instable center position. As soon as the piston motion has exceeded this instable center position in the one or the other direction, the force of the compression spring 82 will support the respective piston motion and will urge the pistons 12 and 112 towards the respective reversal point which is being headed for.

The usable energy of an exhaust gas pulse acting for instance on the working piston 12 has to overcome the force of the compression spring 82 in order to perform a working stroke as far as half the length of a working stroke. When the working piston 12 reaches this position and has moved passed it slightly this further piston motion is aided by the spring 82 and the working piston 12 is urged into its upper reversal point, this meaning that the same time the piston 112 will be moved back into its upper dead center position.

Under the action of the compression spring 82 the working piston 12 will remain at the upper point of reversal, because the spring arrangement 80 is in a stable terminal position and will hold the piston. The exhaust gas outlet 28 will remain opened and the expanded exhaust gas is able to leave without any hindrance.

The next exhaust gas pulse will act on the working piston 112 so that if necessary the blocking force of the spring 84 will be overcome and the working piston 12 will be moved back into its lower reversal point, while after this the working position 112 will be retained in its upper reversal point and the cycle will be repeated until the usable energy of the exhaust gas pulses is able to cause motion of the piston.

In order to set the force of the compression spring 82 there counter-bearing 88 is preferably able to be adjusted on the spring guide 84.

Figure 8:
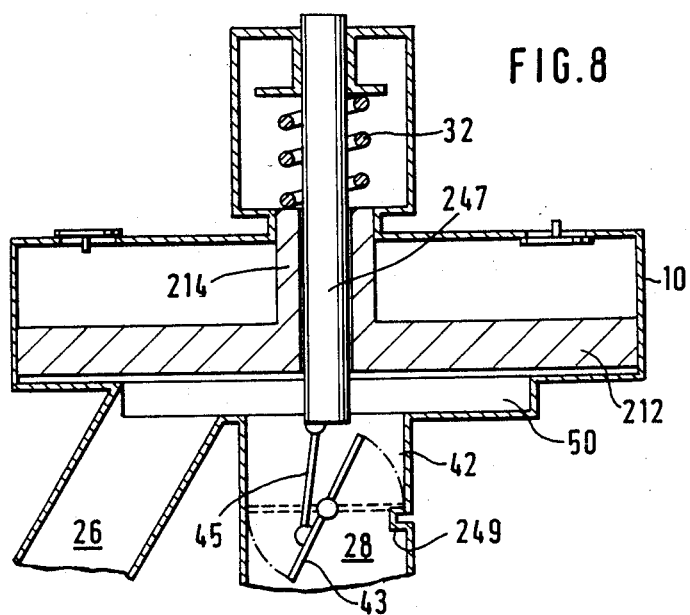
FIG. 8 is an axial section taken through a somewhat modified form of the invention using a turning door as closing member.
Figure 9:
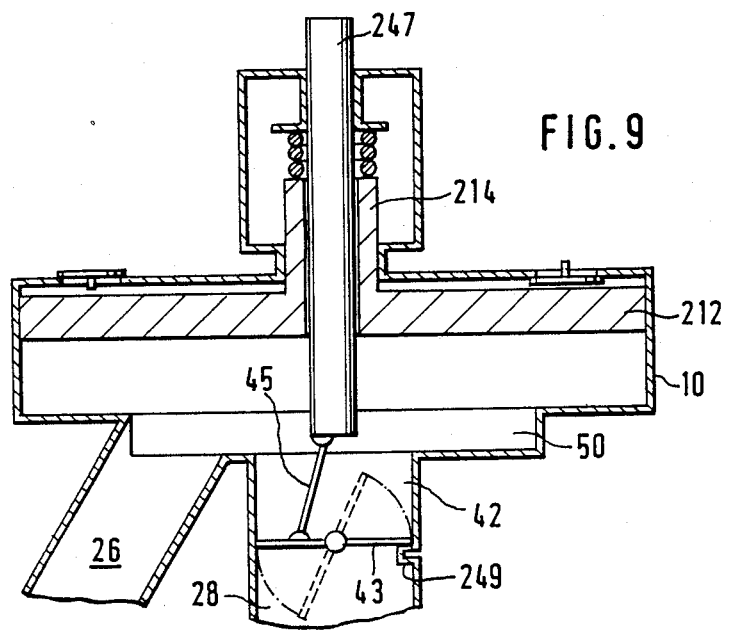
FIG. 9 shows the design of FIG. 8 prior to the start of the return stroke of the working piston.

In the design of FIGS. 8 and 9 there is now a fixed connection between the working piston 212 and the valve flap 43 and instead the setting rod 45 is connected with an inner piston rod 247, which runs with friction in the length direction in the hollow piston rod 214 connected with the working piston 212. The valve flap 43 is provided in the valve section 42 of the exhaust gas outlet 28 with an abutment 249, which holds the valve flap 53 in its closed setting if during a working stroke of the working piston 212 it is pivoted clockwise by the upwardly moving setting rod 45.

In FIG. 8 it will be seen that the working piston 212 has already moved somewhat out of its lower reversal point and when doing this first moved the inner piston rod 247 frictionally with it in an upward direction so that the valve flap 43 is closed. As soon as the valve flap 43 has assumed its closed position, it is no longer possible for the inner piston rod 247 to take part in the upwardly directed motion of the piston and there is slip between the inner piston rod 247 and the outer piston rod 214, which halts until the working piston 212 reaches the upper point of reversal of its motion, which in the case of the exhaust gas having a high amount of energy coincides with the upper terminal point of the piston motion. This upper design-related terminal point will be the more easily reached by the working position if the exhaust gas outlet 28 remains closed during the working stroke with the exception of the initial phase which is required for closing the exhaust gas outlet 28 by the valve flap 43.

As soon as the return motion of the working piston 212 has commenced, the inner piston rod 247 is moved downwards by the frictional connection so that the valve flap 43 is moved into the fully opened setting as shown in FIG. 9. The valve flap 43 dwells in this setting not only until the completion of the return of the working piston 212 but also in the resting state of the working piston in the lower point of reversal until at the start of a new working stroke the valve flap 43 is closed again.

Figure 10:
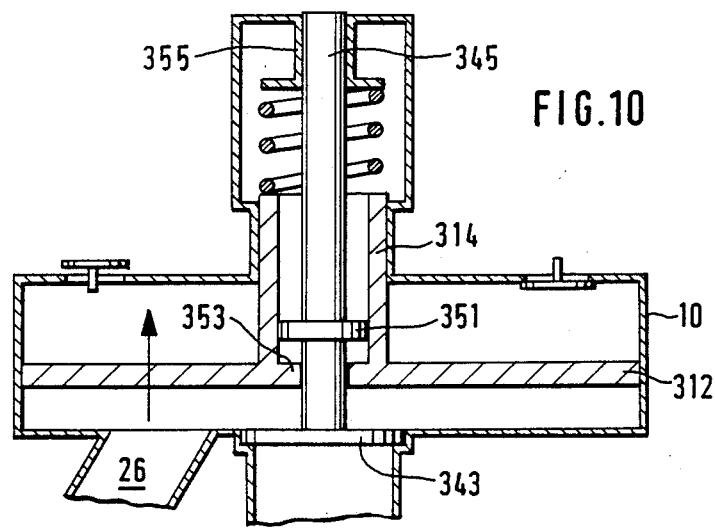
FIG. 10 is an axial section in the case of a further form of the invention with a plate-like closing member during the working stroke.
Figure 11:
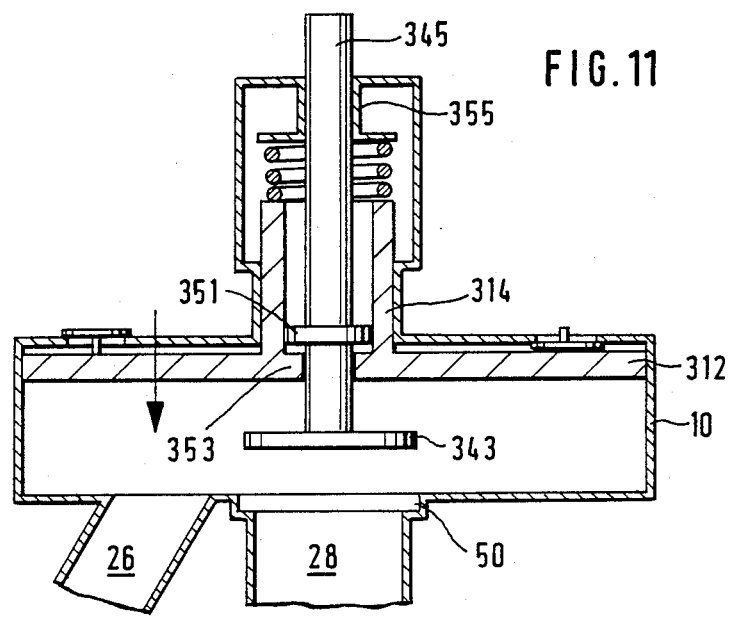
FIG. 11 is an axial section taken through the embodiment of FIG. 10 during the return stroke of the working piston.

FIGS. 10 and 11 show a similar construction in which a setting rod 345 moving in the hollow piston rod 314 is again used for operation of the valve, same however being connected with a plate-like closing member 343, its free motion in relation to the hollow piston rod 314 only being limited by two abutments, of which one is the closing member 343 itself and the other is formed by a collar 351 on the setting rod 345. Between this collar 351 and the closing member 343 there extends a drive member 353 of the working piston 312 and, respectively on the hollow piston rod 314 into the path of motion of the two abutments 343 and 351. The setting rod 345 extends upwardly out of the hollow piston rod 314 and extends with friction through a stationary brake ring 355.

The closing member 343 seals off the exhaust gas outlet 28 in its closing position (FIG. 10) in a groove 50 provided in the lower end surface 20 of the cylinder 10, a measure being taken to see that it is possible for exhaust gas pulses having only a slight amount of usable energy to be able to enter the exhaust gas outlet 28.

If an exhaust gas pulse with a sufficiently large amount of usable energy arrives, the working piston 312 is moved upwards, at least the closing member 353 being held by the effect of the brake ring 355 in its closed position. Only after the drive member 353 has engaged the collar 351, something that is the case when the working piston 312 draws close to its upper reversal point, the closing member 353 is lifted into its opened position. It is entrained by the working piston 312 until the latter reaches the upper reversal point of its motion. At the start of the return stroke the setting rod 345 is retained by the brake ring 355 until the drive member 353 engages the closing member 343 and entrains the latter as far as its closed position, something that is indicated in FIG. 11.

Figure 12:
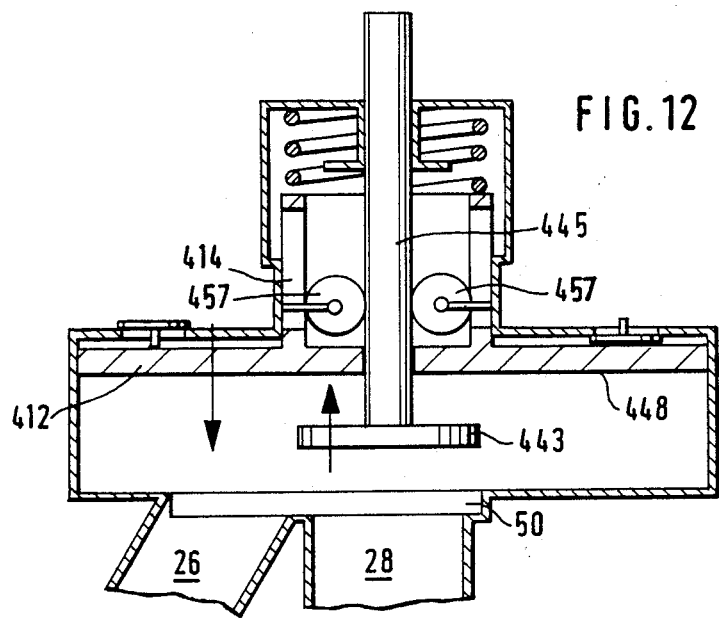
FIG. 12 represents an axial section taken through a still further form of the invention with a plate-like closing member during the return stroke of the working piston.

In the case of the modified design to be seen in FIG. 12 a setting rod 445 is fixed joined to a plate-closing member 443, and runs in the hollow piston rod 414 of the working piston 412. Between the setting rod 445 and the inner surface of the hollow piston rod 414 there are frictional wheels 457, same being able to transmit the motion of the piston rod 414 to the setting rod 445 if it is not prevented from moving by resistance. Such a resistance will be effective if the closing member 443 engages the exhaust gas outlet 28 in its closed position or if it strikes the piston floor 448 or another abutment provided for the working piston 412.

When the working piston 412 commences its working stroke, the frictional wheels 457 will tend to press the closing member downwards into its closed setting, in which it will remain as far as the upper point of reversal of the piston motion. As soon as the working piston 412 moves downwards, the setting rod 445 will be moved upwards and thus open the exhaust gas outlet 28, because the closing member moves upwards as far as engagement with the abutment on the working piston 412. During the further course of the piston motion towards the lower point of reversal, the closing member 443 will be moved down, the arrangement preferably being preferably such that the closing member 443 does not cover the exhaust gas outlet, when the working piston has arrived at the lower point of reversal. It is only at the start of the working stroke that the exhaust gas outlet 28 is completely closed in the manner described.

The manner of operation of this modified form of the invention shown in FIG. 12 is comparable with the working embodiment shown in FIGS. 8 and 9 inasfar as in both cases the reversal of the valve takes place at the start of stroke so that there is a "non-symmetrical" opening characteristic of the valve with reference to the point of reversal of the working piston 212 and, respectively, 412 after the working stroke thereof. Since there is slip in the means for transmission of motion on the one hand between the working piston 212 and, respectively, 412 and the closing member and on the other hand the closing members 43 and 443, respectively, of the valve it is possible to ensure that the valve will have completed its full valve stroke shortly after the commencement of the respective stroke of the working piston 212 and, respectively 412 and assumes a position which is optimum for this stroke.

Figure 13:
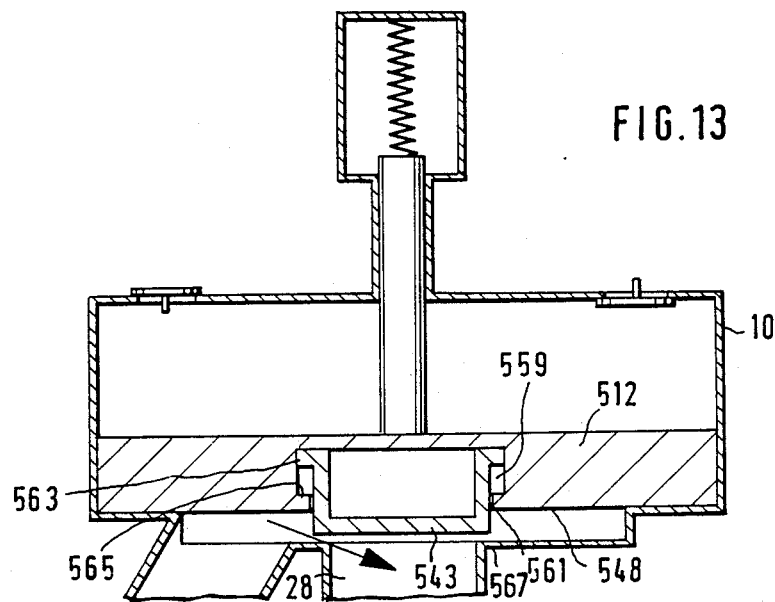
FIG. 13 is an axial section taken through a further design in the resting state.

In the case of the working example shown in FIG. 13 as well there is a similar "asymmetrical" opening characteristic. In this case a chamber 559 is arranged in the working piston 512 so as to be centered on the axis 10 of the cylinder, the such chamber having an opening 561 arranged in the floor 584 of the working piston 512, such opening having a smaller cross section than the chamber 559. A valve closing member 543 with a cross section adapted to suit that of the opening 561 is so arranged in the chamber 559 that it is guided by a collar 563 (which is adapted to the cross section the 559) at its inner end (inner in relation to the chamber 559, that is) axially in the chamber 559. When the closing member 543 is completely inserted into the chamber 559, its outer end still being guided at the opening 561, there is an axial clearance between the collar 563 the one hand and an abutment shoulder 565 formed by a widening of the cross section of the chamber 559 so as to be wider than the opening 561, such shoulder being turned towards the collar 563, such axial clearance being somewhat less than the length of the stroke of the working piston 512. The distance or clearance is the same as the distance moved by the working piston 512 before the exhaust gas outlet 28 is opened towards the end of the working stroke.

If as shown in FIG. 13 the working piston 512 in the resting state termed the point of reversal, the closing member 543 will be at the bottom of the groove 50 on abutments 567 extending somewhat above the floor groove, such abutments keeping open a gap through which the exhaust gas may escape during idling of the IC engine. The collar 563 is near to the upper end, remote from the opening 561, of the chamber 559. When the working piston 512 commences its working stroke, the closing member 543 will be caused by inertia to keep in the indicated closed setting until the abutment shoulder 565 engages the collar 563. At this point in time the working piston 512 will have completed the greater part of its working stroke. The closing member 543 is accelerated in the direction of the working stroke. When the working piston 512 has reached its upper reversal point, it is moved back downwards again by the returning force. The closing member 543 however will firstly be moved under the influence of inertia further upwards until it engages the upper end of the chamber 559, following which it is entrained by working piston 559 downwards again. Since the closing member 543 is then drawn back into the chamber, 559, the exhaust gas outlet 28 remains fully open until the working piston 512 has returned to its lower point of reversal.

Figure 14:
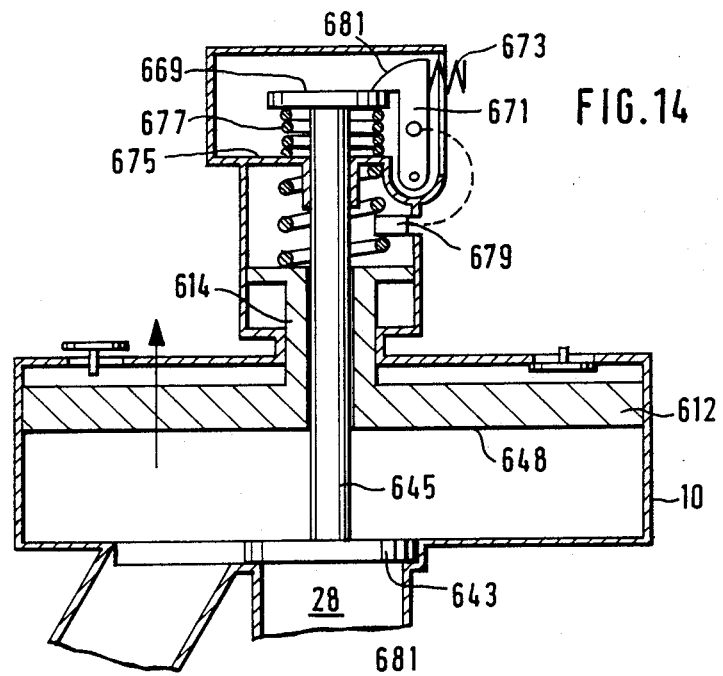
FIG. 14 is an axial section taken through a further embodiment during the working stroke of the working piston.
Figure 15:
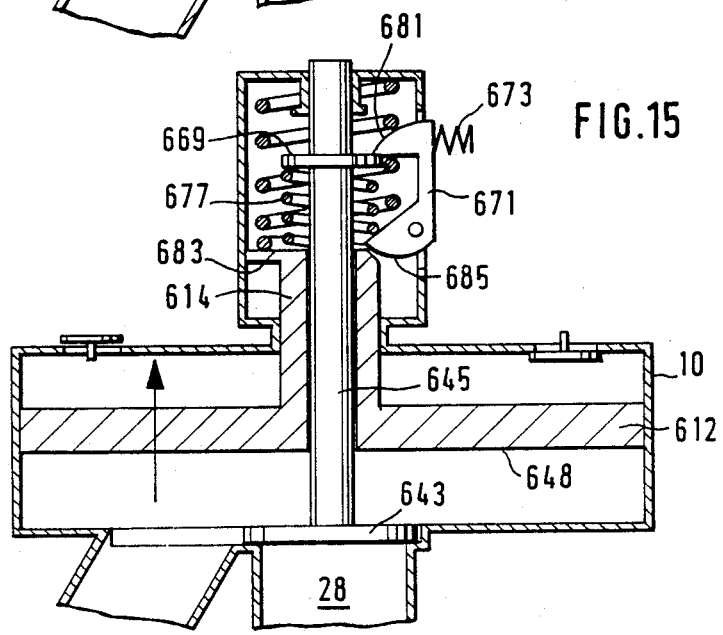
FIG. 15 is an axial section taken through a modified form of the embodiment shown in FIG. 14, also during the working stroke of the working piston.

The working example of the invention shown in FIGS. 14 and 15 serves to keep the exhaust gas outlet 28 closed during the working stroke and open during the return stroke.

In this case as well the working piston 612 is fixedly joined to a hollow piston rod 614, through which the setting rod 645 runs longitudinally which is connected with the plate-like closing member 643. At its end remote from the closing member 643 the setting rod 645 is provided with a collar 669. A locking latch, which is pivoted so as to be stationary in relation to the cylinder 10 is biased by a spring 673 into a locking setting extending into the path of the collar 669. The locking latch 671 is so arranged that on the side remote from the closing member 643 it can fit over the collar 669, when the closing member 643 is located in its setting shutting off the exhaust gas coming from the IC engine during idling apart from an outlet gap and in its setting closing the exhaust gas outlet 28. Between the collar 669 and a stationary counter-abutment having the setting rod 645 passing through it there is a compression spring 677 urges the closing member 643 into an open setting, in which it engages the floor 684 of the working piston 612.

The working piston 612 or a piston rod 614 connected with it is so provided with a stationary release 679 that it is actuated when the working piston 612 gets near its upper point of reversal. The release 679 is so connected, for example electrically or mechanically, with the locking latch 671 that during its actuation it moves the locking latch 671 out of its locked position. As a result it is possible for the compression spring 677 to press the closing member 643 into its open setting, in which it engages the piston floor 648. The return stroke of the piston 612 causes the closing member 643 to be moved back into its closed setting, which it reaches at the end of the return stroke of the working piston 612. Then the collar 663 engages an oblique driving edge 681 of the locking latch 671 in order push it out of the way on return into the locking setting. The closing member 643 then keeps in the closed setting until towards the end of the next working stroke of the working piston 612 it is released again and lifted by the compression spring 677.

In the case of the design shown in FIG. 15 it is a question of an arrangement similar to that of FIG. 14, although however the compression spring 677 is located between the collar 669 and a collar 683 on the hollow piston rod 614 and the locking latch 671 releases the closing member 643 when the hollow piston rod 614 engages a driving edge 683 provided on the locking latch 671.

Figure 16:
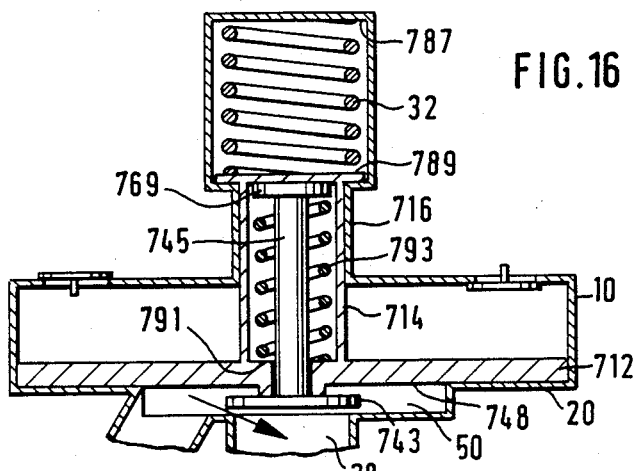
FIG. 16 is an axial section through a further working example in the resting state.
Figure 17:
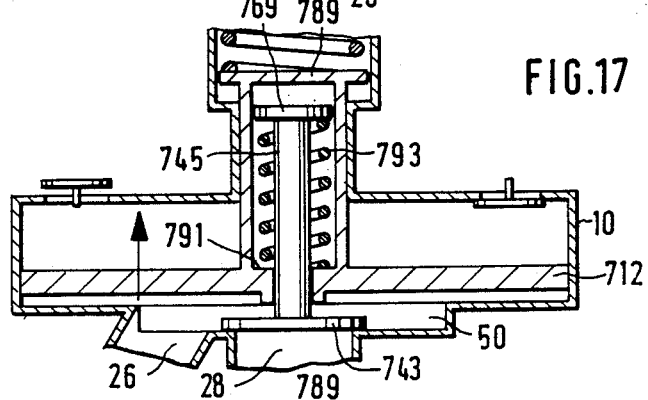
FIG. 17 shows an axial section taken through the working example of the invention as in FIG. 16 at the start of the working stroke of the working piston.
Figure 18:
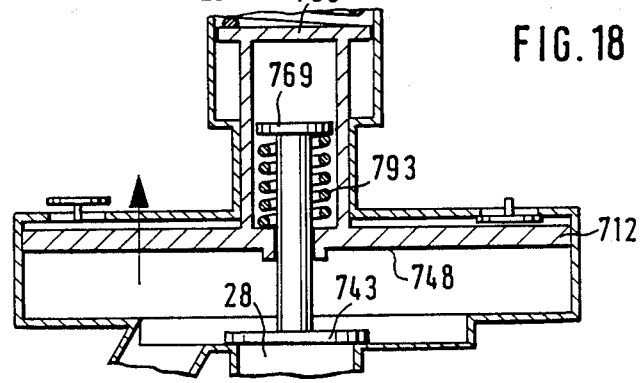
FIG. 18 is an axial section similar to FIG. 16 at the end of the working stroke of the working piston.

FIGS. 16 through 18 show a particularly simple design which also makes possible an "asymmetrical" opening characteristic for the valve at the exhaust gas outlet 28.

In FIG. 16 a working piston 712 provided with a hollow piston rod 714 will be seen in its resting setting it which it is acted upon by a return spring 32 placed between a counter-abutment 787 arranged on the guide 716 of the piston rod 714 and a guide member 789 on the piston rod 714. A plate-like closing member 743 is connected with a setting rod 745, which is guided by a guide member 769 in the hollow piston rod 714, a compression spring 793 being placed between the guide member 769 and a shoulder 791 formed on the working piston 712 on its side facing the closing member, such spring urging the closing member 743 towards the floor 748 of the piston. The arrangement is however such that the closing member 743 is kept at a small clearance from the piston floor 748.

In the resting position shown in FIG. 16 the working piston 712 is in engagement with the lower end surface 20 of the cylinder 10, the closing member 743 being drawn by the compression spring 793 against the floor 748 of the piston and thus maintains a small clearance from the floor of the groove 50 so that the gap, already mentioned a number of times, is kept open for the escape of the exhaust gas during idling.

On the arrival of an exhaust gas pulse with sufficient usable energy the pressure of the exhaust gas causes the closing member 743 to be sucked against the effect of the compression spring 793 towards the floor of the groove 50 and the exhaust gas outlet is completely closed by the build up of pressure so that the exhaust gas energy may be optimally utilized. When the working piston 712 starts its working stroke, the exhaust gas outlet will remain closed until the force of the compression spring 793, which is being tensioned, overcomes the exhaust gas pressure acting on the closing member 743 and the latter is thereby drawn against the floor 748 of the piston. The commencement of the working stroke with the exhaust gas outlet shut is indicated in FIG. 17.

The force of the compression spring 793 is preferably arranged to be such that the exhaust gas outlet is only opened towards the end of the working stroke of the working piston 712. The state of things just prior to the opening of the closing member is shown in FIG. 18. On opening exhaust gas outlet the closing member 743 moves closer to the working piston 712. The position of the closing member 743 in relation to the working piston 712 like in FIG. 16 is only adhered to in the resting position of the working piston 712 until a further working stroke of the working piston 712 commences.

In the case of the working example of FIGS. 19 through 21 the working piston 812 only acts on the closing member 843 during the final phase of its return stroke. In order to press the closing member 843 into the resting position illustrated in FIG. 19.

The plate-like closing member 843 is fixedly secured to a cylindrical guide sleeve 811, which fits around a stationary guide sleeve 815 which is arranged adjacent to the exhaust gas outlet 28 and is carried by a spider 813 arranged in the exhaust gas outlet 28, compression spring 817 being arranged in the two guide sleeves 811 and 815, such spring bearing at one end against the spider 813 and at the other end on the closing member 843 and thus tending to force the closing member 843 into its open position lifted clear of the exhaust gas outlet 28.

If the working piston 812 is in its resting position (see FIG. 19), it will force the closing member 843 against the action of the compression spring 817 into a setting in which only a small gap 821 is left open between the closing member 843 and the end surface 20 of the cylinder 10, through which the exhaust gas may escape to the outlet for exhaust gas during idling.

If the exhaust gas pressure increases, the flow velocity in the gap 821 increases to such an extent that there is vacuum in this gap following Bernoulli's law, this drawing the closing member 843 against the action of the compression spring 817 fully against the end surface 20 so that the full exhaust gas pressure may take effect on the working piston 812 and the closing member 843. The working stroke of the working piston 812 means that the exhaust gas expands so that the compression spring 817 ultimately moves the closing member 843 into the open setting which it keeps to until towards the end of the return stroke of the working piston 812 this latter forces the closing member back into the rest position as illustrated in FIG. 19.

Figure 22:
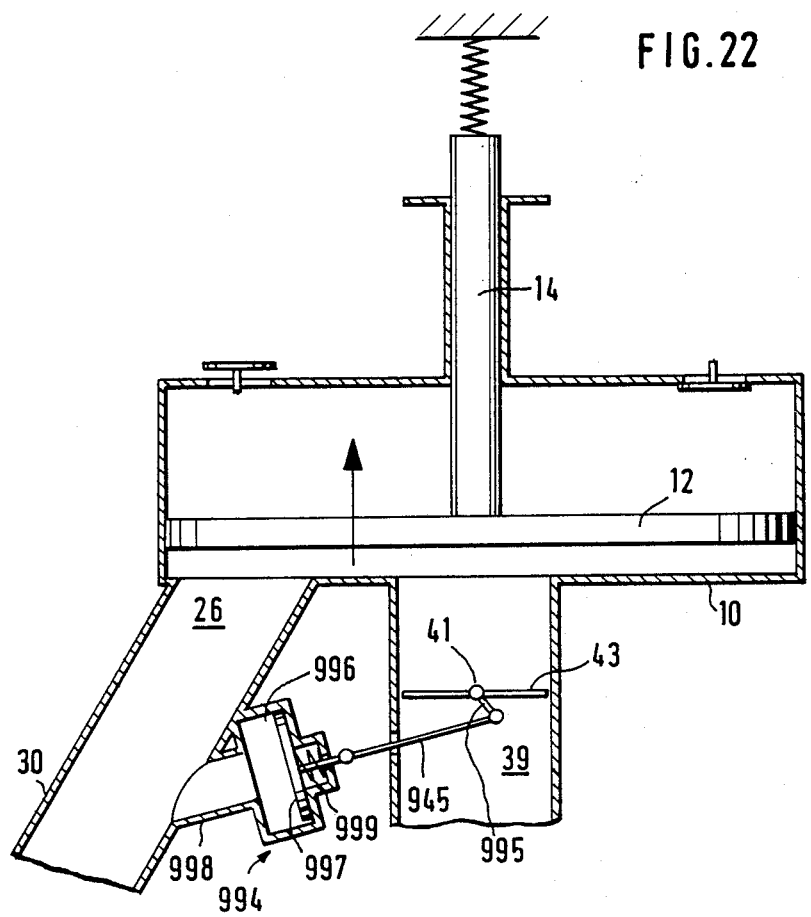
FIG. 22 is a section through a still further possible valve arrangement.

The embodiment shown in FIG. 22 for example only shows a rotary flap 43 as a closing member which is connected with an actuating mechanism generally referenced 994. This actuating mechanism comprises a setting lever 995, which together with the rotary flap 43 is able to be pivoted about a shaft 41 extending through the exhaust gas duct 39, a setting rod being articulated at one end with a piston 997 and on the other end with the setting rod 995 so that in accordance with the motion of the piston 997 caused by the setting rod 945 the setting lever 995 may be pivoted together with the rotary flap 43, and also a stationarily arranged cylinder 996 with the piston 997 running in it and being connected on the side remote from the setting rod 945 upstream from the exhaust gas inlet 26 with the exhaust gas duct 30, leading to the exhaust gas inlet 26, via a branch duct 998. The piston 997 is urged by a return spring 999 towards the branch duct 998.

On the arrival of an exhaust gas pulse in the exhaust gas duct 30 running to the exhaust gas inlet 26 whose usable energy is at least sufficient for the force of the return spring 999 to be overcome, the piston 997 is so displaced in the cylinder 996 that via setting rod 945 and the setting lever 995 the rotary flap 43 is transferred into its closed setting so that any usable energy still present of the exhaust gas pulse will firstly be able to actuate the working piston 912 via the exhaust gas duct 39. After expansion of the exhaust gas the return spring 999 urges the piston 997 back into its resting position so that the turning flap 43 is moved into the open setting and the exhaust gas is let off via the exhaust gas duct 39.

In lieu of the piston 997 it is also possible to provide a diaphragm, for instance, the return force then possibly being provided by the inherent elasticity of the diaphragm.

Figure 23:
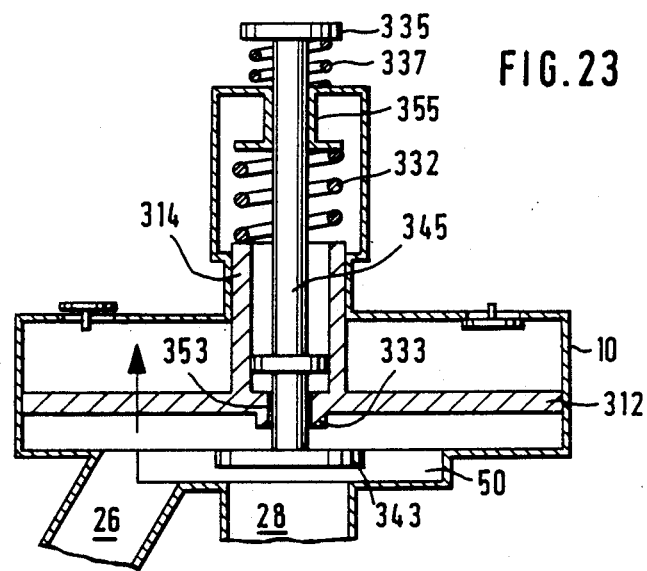
FIG. 23 is an axial section through a modified form of the design shown in FIGS. 10 and 11 during the working stroke of the working piston.
Figure 24:
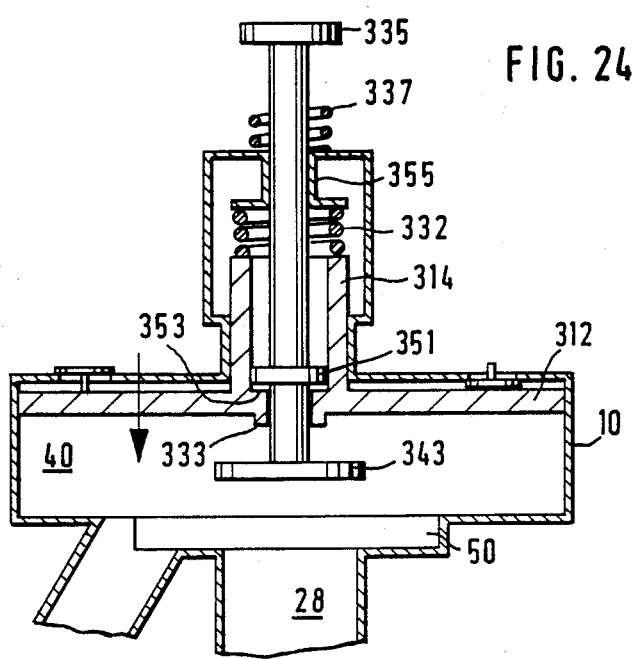
FIG. 24 is an axial section through the modified design of FIG. 23 at the start of the return stroke of the working piston.

A modified form of the embodiment of FIGS. 10 and 11 is to be seen in FIGS. 23 and 24, parts the same as those included in the embodiment of FIGS. 10 and 11 being denoted by like reference numerals. In the case of the modified form of FIGS. 23 and 24 there is a head 333 formed on the lower side, turned towards the closing member 343, of the working piston 312 adjacent tot the drive part 353, such head annularly surrounding the setting rod 345 and being adapted to leave a gap between the working piston 312 and the closing member 434, such gap corresponding to the axial extent of the head 333. There is a return spring 332 urging the working piston towards its resting position or the lower point of reversal. One end of this spring 332 bears against the piston rod 314 and the other end bears against the stationary brake ring 355. On the side of the braking ring 355 remote from the working piston 312 and the closing member 343 the end of the setting rod 345 is provided with an end plate 335 and between this end plate 335 and the brake ring 355 there is a compression spring 337 which urges the setting rod 345 and the closing member 343 into the position shown in FIG. 23 in relation to the brake ring 355.

If the working piston 312 is at its lower point of reversal, the head 33 will press the closing member 343 against the effect of the spring 337 towards the exhaust gas outlet 28, the axial length of the head 333 however being such that the exhaust gas outlet 28 is not fully closed.

If an exhaust gas with sufficient usable energy arrives, the pressure taking effect at the gap between the working piston 312 and the closing member 343 will cause the closing member 343 to engage the exhaust gas outlet 28 with further compression of the compression spring 337 so that the outlet 28 is shut off and owing to the expansion of the exhaust gas the working piston 312 will be moved towards the upper point of reversal. As soon as the exhaust gas has expanded to such an extent that the force urging the closing member 343 into its shut setting may be overcome by the compression spring 337, the compression spring 337 moves the closing member 343 clear of the exhaust gas outlet. This takes place whatever the setting of the working piston 312, unless the driving part 353 has already reached the collar on the setting rod 345 and entrained same so that the end plate 335 had already been moved clear by the compression spring 337. In the case of every complete working stroke of the working piston 312 the closing member 343 is lifted as far up as the position shown in FIG. 24 and then retained by the brake ring 355 until the head 333 again engages the closing member 343 and entrains it one the return motion of the working piston.

In the resting state of the working piston 312 as well the spring 337 serves to ensure only a slight degree of opening of the exhaust gas outlet 28, necessary for example during idling; however it also opens the exhaust gas outlet 28 when the usable energy of the exhaust gas pulse is not sufficient to move the working piston so far that the driving part 353 is able to entrain the collar 351 and move the closing member 343 clear of the exhaust gas outlet. The outlet is open all the time if the pressure on the closing member 343 falls below a value as dictated by the spring 337.

I claim:

1. A method for the operation of a controllable valve means at the exhaust gas outlet of a piston charger adapted to be driven by the exhaust gas pulses of an IC engine, said piston charger having at least one expansion space cavity delimited by a moving working piston, charging air portion of said cavity provided with at least one charging air inlet and at least one charging air outlet connected to the engine air intake, the limit of the expansion space cavity opposite to the working piston being provided with at least one exhaust gas inlet and at least one exhaust gas outlet, said controlled valve means directly coupled with said piston and associated with said exhaust gas outlet, said method comprising the steps of:

exhausting gas from the internal combustion engine into the expansion space of the charger cavity;

moving said piston in said expansion space with said exhaust gas;

preventing exhaust gas from exiting said expansion space cavity with said control valve means until said piston has moved a desired distance in said expansion space;

compressing charging air in the charging portion of the charger cavity;

opening said exhaust outlet with said controllable valve means; and enabling the exhaust gas to exit said exhaust gas outlet.

2. A valve arrangement on a piston charger adapted to be driven by the exhaust gas pulses of an IC engine, said piston charger having at least one expansion space delimited by a moving working piston, said expansion space provided with at least one charging air inlet and at least one charging air outlet connected to the engine air intake, the limit of the expansion space opposite to the working piston being provided with at least one exhaust gas inlet and at least one exhaust gas outlet, a controlled closing member associated with said exhaust gas outlet, said controlled closing member comprised of a flap member opening and closing said exhaust gas outlet, a setting rod connected with said flap member and a rod member connected by a releasable friction fit to said piston, a tube member on said piston for providing said friction fit and said tube member being automatically releasable upon attaining of a setting force threshold wherein said moving member is moved between its opened and closed settings.

3. The valve arrangement as claimed in any one of the claim 2 characterized in that the closing member (43 and 943) is a rotary flap (43 and 943), which is able to be turned between a closing position and an opening one on a shaft (41) extending through the exhaust gas outlet.

* * * * *